United States Patent
Banerjea et al.

(10) Patent No.: US 9,313,125 B2
(45) Date of Patent: Apr. 12, 2016

(54) METHOD AND APPARATUS FOR DISABLING TRANSMISSION OF A PACKET WITH AGGREGATED DATA FROM MULTIPLE PACKETS HAVING AN ADDRESS FOR A GROUP OF NETWORK DEVICES

(71) Applicant: Marvell World Trade LTD., St. Michael (BB)

(72) Inventors: Raja Banerjea, Sunnyvale, CA (US); Robert Fanfelle, Redwood City, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 114 days.

(21) Appl. No.: 14/312,878

(22) Filed: Jun. 24, 2014

(65) Prior Publication Data

US 2014/0301382 A1  Oct. 9, 2014

Related U.S. Application Data

(63) Continuation of application No. 12/402,739, filed on Mar. 12, 2009, now Pat. No. 8,761,069.

(60) Provisional application No. 61/046,351, filed on Apr. 18, 2008.

(51) Int. Cl.
*H04L 12/741* (2013.01)
*H04L 12/18* (2006.01)
(Continued)

(52) U.S. Cl.
CPC ............ *H04L 45/74* (2013.01); *H04L 12/1877* (2013.01); *H04W 84/12* (2013.01); *H04L 12/189* (2013.01); *H04W 4/06* (2013.01); *H04W 28/065* (2013.01)

(58) Field of Classification Search
None
See application file for complete search history.

(56) References Cited

U.S. PATENT DOCUMENTS

| 2003/0091021 A1 | 5/2003 | Trossen et al. |
| 2004/0179475 A1 | 9/2004 | Hwang et al. |

(Continued)

FOREIGN PATENT DOCUMENTS

JP  2007-049382  2/2007

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

(Continued)

*Primary Examiner* — Diane Lo

(57) ABSTRACT

A first network device including a first module, a control module, an aggregation module, a format module and an interface. The first module relates multiple addresses of a group of network devices to a first address. The control module determines whether both first packet and second packets have the first address. The aggregation module, in response to determining that the first and second packets have the first address, concatenate the first and second packets to provide aggregated data. The format module adds a header to the aggregated data to generate a third packet for a second network device. The interface, based on whether transmission to the second network device is enabled for the third packet, transmits the third packet to the second network device. The first module disables transmission of the third packet if a timer expires or a leave message is received from the second network device.

20 Claims, 5 Drawing Sheets

(51) Int. Cl.
*H04W 84/12* (2009.01)
*H04W 4/06* (2009.01)
*H04W 28/06* (2009.01)

(56) References Cited

U.S. PATENT DOCUMENTS

| | | |
|---|---|---|
| 2005/0180440 A1 | 8/2005 | Perrot et al. |
| 2006/0252443 A1 | 11/2006 | Sammour et al. |
| 2007/0230408 A1 | 10/2007 | Trainin et al. |
| 2008/0137681 A1 | 6/2008 | Kish et al. |
| 2009/0036152 A1 | 2/2009 | Janneteau et al. |
| 2009/0147718 A1 | 6/2009 | Liu et al. |

OTHER PUBLICATIONS

IEEE Std 802.11b-1999/Cor Jan. 2001 (Corrigendum to IEEE Std 802.11b-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 2: Higher-Speed Physical Layer (PHY) extension in the 2.4 GHz band-Corrigendum 1; LAN/MAN Standards Committee of the IEEE Computer Society; Nov. 7, 2001; 23 pages.

IEEE Std 802.11g/D8.2, Apr. 2003 (Supplement to ANSI/IEEE Std 802.11 1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE Std 802.11e/D11.0, Oct. 2004 (Amendment to ANSI/IEEE Std 802.11-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements; Part 11: Wireless Mdeium Access Control (MAC) and Physical Layer (PHY) specifications: Amendment 7: Medium Access Control (MAC) Quality of Service (QoS) Enhancements; Sponsor LAN/MAN Committee of the IEEE Computer Society; 195 pages.

IEEE P802.11w™ /D4.0, Nov. 2007; Draft Standard for Information Technology—Telecommunications and information exchange between systems—Local and metropolitan area networks—Specific requirements—Part 11: Wireless LAN Medium Access Control (MAC) and Physical Layer (PHY) specifications; Amendment 5: Protected Management Frames; IEEE 802 Committee of the IEEE Computer Society; 63 pages.

IEEE Std 802.11v/D1.02, Sep. 2007; Draft Standard for Information Technology—Telecommunications and informatio exchange between systems—Local and metropolitan area networks—Specific requirements—Part 11: Wireless LAN Medium Access Control (MAC) and Physical Layer (PHY) specifications; Amendment 9: Wireless Network Management; 802.11 Working Group of the IEEE 802 Committee; 204 pages.

IEEE Std 802.11i™—2004 (Amendment to IEEE Std 802.11™, 1999 Edition (Reaff 2003) as amended by IEEE Stds 802.11a™—1999, 802.11b™—1999, 802.11b™—1999/Cor 1-2001, 802.11d™—2001, 802.11g™—2003, and 802.11h™—2003]; IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (Mac) Security Enhancements; IEEE Computer Society; Sponsored by the LAN/MAN Standards Committee; Jul. 23, 2004; 189 pages.

U.S. Appl. No. 12/012,196, filed Jan. 31, 2008; "Wireless Multicast Proxy"; Robert Fanfelle et al.; 30 pages.

W. Fenner; Xerox Parc; "Internet Group Management Protocol, Version 2; rfc2236.txt"; Nov. 1997; 24 pages.

METHOD AND APPARATUS FOR DISABLING TRANSMISSION OF A PACKET WITH AGGREGATED DATA FROM MULTIPLE PACKETS HAVING AN ADDRESS FOR A GROUP OF NETWORK DEVICES

CROSS-REFERENCE TO RELATED APPLICATIONS

The present disclosure is a continuation of U.S. patent application Ser. No. 12/402,739 (now U.S. Pat. No. 8,761, 069), filed Mar. 12, 2009. This application claims the benefit of U.S. Provisional Application No. 61/046,351, filed on Apr. 18, 2008. The entire disclosures of the above applications referenced above are incorporated herein by reference.

FIELD

The present disclosure relates generally to data packet exchanges. More particularly, the present disclosure relates to conversion of packets from a multicast format to a unicast format.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multicast communications allow data to be provided to multiple end points from a single source during a given time period. In contrast, unicast communications provide data to a single end point from a single source during a similar time period. Data transfer time is lower for multicast communications than it is for unicast communications because multicast communications allow data to be received by more ends points for a similar amount of time.

Broadband Internet media delivery services, such as Internet Protocol Television (IPTV), commonly use multicast packets to transport data. In contrast, wireless local-area networks (WLANs) are commonly used to distribute unicast data. Because multicast packets are not acknowledged in WLANs, multicast packets are subject to high error rates. These high error rates may significantly reduce the quality of the media being delivered and so render WLANs unsuitable for communications involving multicast packets.

SUMMARY

A network device includes a first interface that receives multicast packets and a control module that determines that N of the multicast packets have a common multicast address. The network device also includes a packet aggregation module that uses the N of the multicast packets to form aggregate data. The network device also includes a packet format module that adds a header to the aggregate data to form a unicast packet. The network device also includes a second interface that transmits the unicast packet. N is an integer greater than or equal to 1.

In other features, the packet aggregation module concatenates the N of the multicast packets to form the aggregate data without removing data from the N of the multicast packets. The aggregate data corresponds to an aggregate media access control service data unit (AMSDU), and each of the N of the multicast packets corresponds to a subframe of the AMSDU. Further, the network device includes a multicast snoop module that generates a table relating MAC addresses of wireless clients within the WLAN with multicast addresses. The control module identifies X of the wireless clients based on the table and the common multicast address of the N of the multicast packets. X is an integer greater than or equal to 1.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
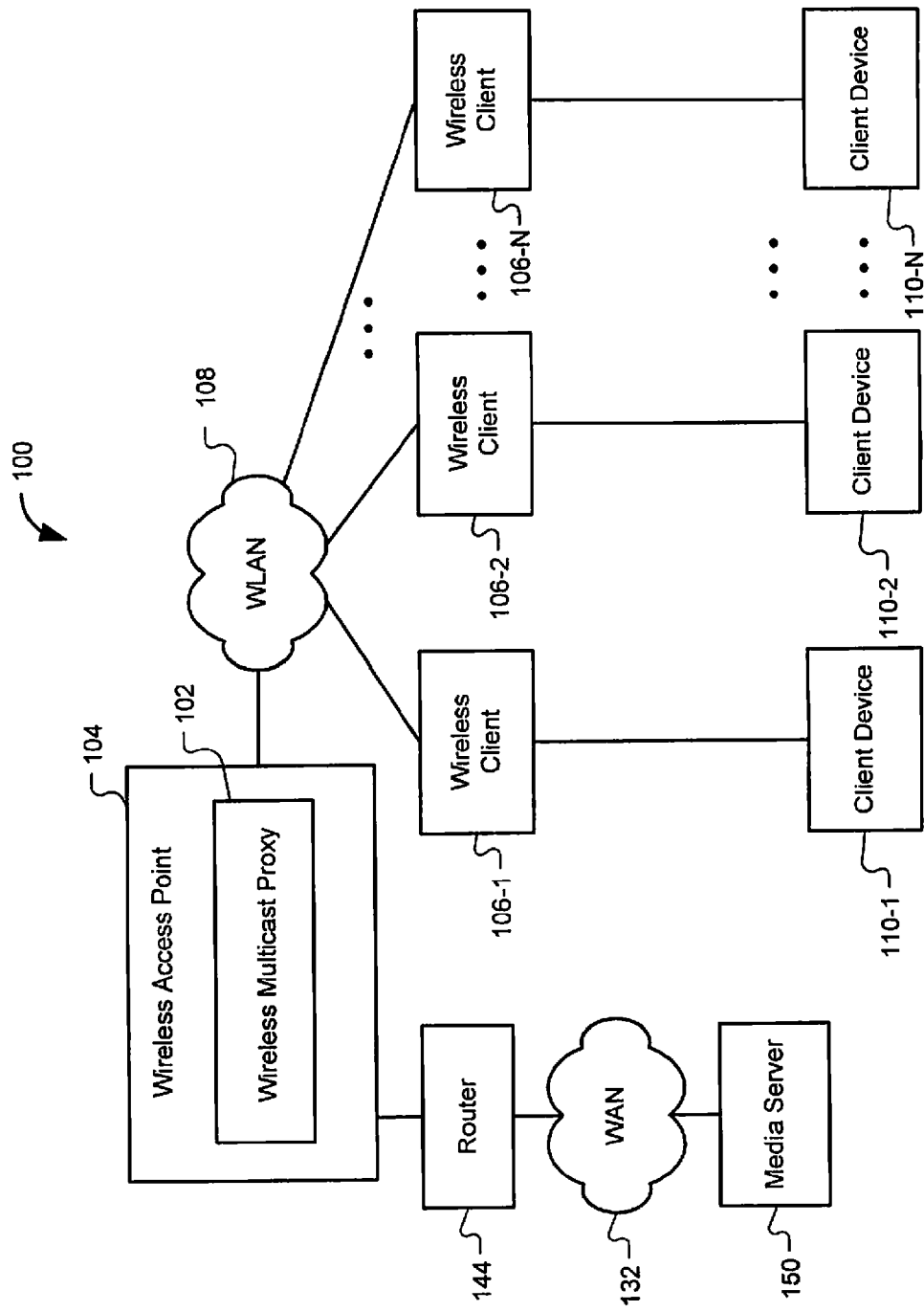
FIG. 1A illustrates a data communication system, according to an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure includes a wireless multicast proxy of a network device that receives Internet Protocol (IP) multicast packets, identifies wireless clients for the packets, and wirelessly transmits unicast packets to the wireless clients. Network devices of the present disclosure may be compliant with all or part of the Institute of Electrical and Electronics Engineers (IEEE) standard 802.11, including draft and approved amendments 802.11a, 802.11b, 802.11e, 802.11g, 802.11i, 802.11k, 802.11n, 802.11v, and 802.11w, which are incorporated herein by reference, as of the date of filing of U.S. Provisional Patent Application Ser. No. 61/046,351. For example, the wireless multicast proxy may use IEEE 802.11n features to convert a multicast IEEE 802.3 packet to unicast IEEE 802.11 packets.

Referring now to FIG. 1A, a data communication system 100 includes a wireless multicast proxy 102 of a network device, such as a wireless access point 104, according to an embodiment of the present disclosure. In the data communication system 100, the wireless access point 104 communicates with one or more wireless clients 106-1, 106-2, . . . , and 106-N (referred to herein as wireless clients 106) over a wireless local-area network (WLAN) 108. The wireless clients 106 may include wireless bridges. In alternative embodiments, the wireless multicast proxy 102 need not be implemented as part of a wireless access point 104, and the wireless network need not be implemented as a WLAN 108.

Each wireless client 106 may communicate with one or more client devices 110-1, 110-2, . . . , and 110-N (referred to herein as client devices 110). For example, a first wireless client 106-1 communicates with a first client device 110-1, while a second wireless client 106-2 communicates with a second client device 110-2. Client devices 110 may be used to render media data sent by the wireless multicast proxy 102. For example, the first client device 110-1 may present audio and video based on packets of media data, such as IP television (IPTV) packets and the like. Examples of client devices 110 include digital televisions (DTVs) and personal computers.

Figure 1B:
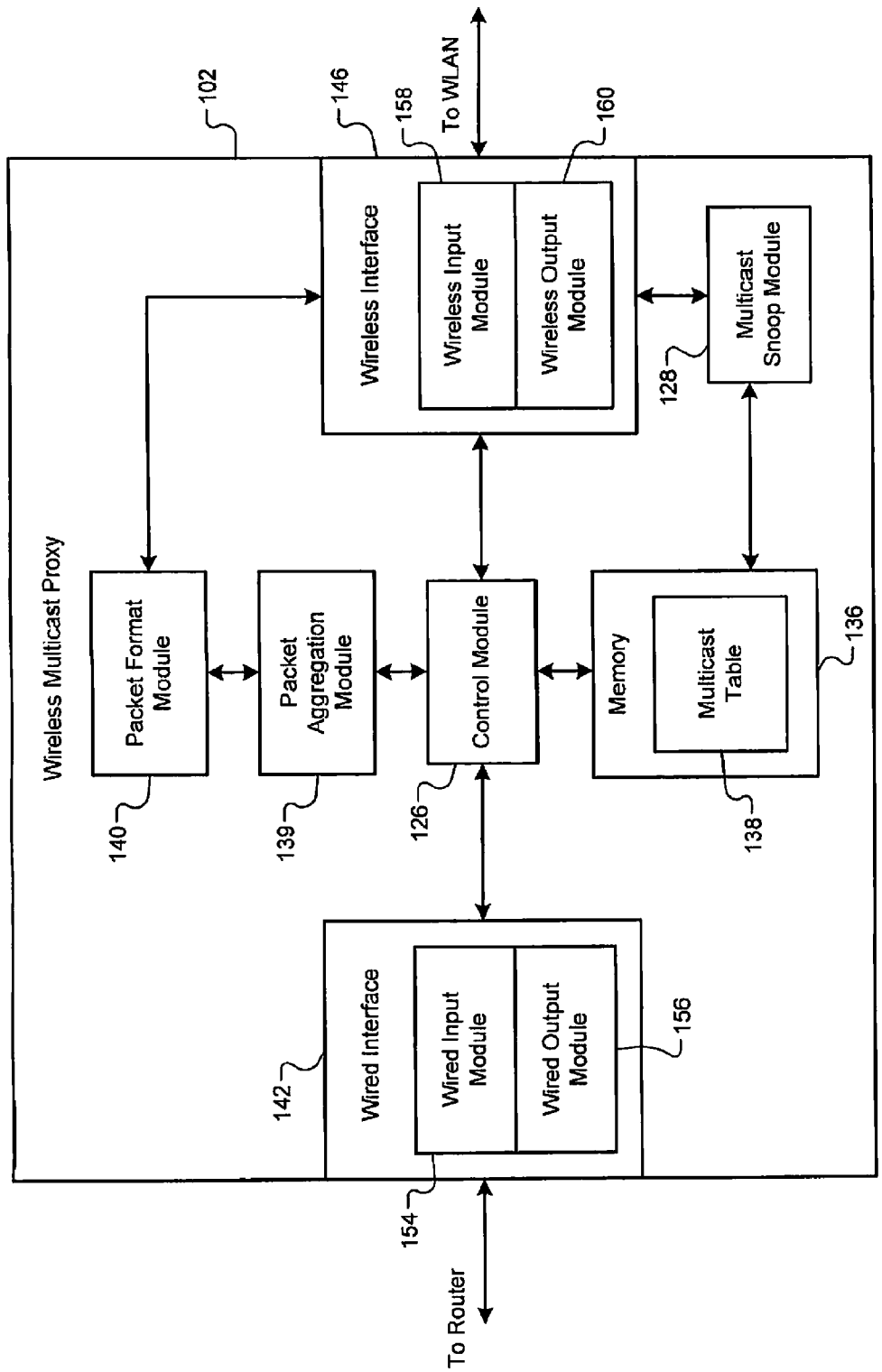
FIG. 1B illustrates a wireless multicast proxy, according to an embodiment of the present disclosure.

Referring now to FIG. 1B, the wireless multicast proxy 102 may include a control module 126, a multicast snoop module 128, memory 136, a packet aggregation module 139, and a packet format module 140. The control module 126 may identify the wireless clients 106 based on a multicast table 138 stored in the memory 136. The multicast table 138 may relate media access control (MAC) addresses of the wireless clients 106 with multicast IP addresses, as described below. The multicast snoop module 128 may generate the multicast table 138 by snooping Internet Group Management Protocol (IGMP) messages transmitted by the wireless clients 106.

The wireless multicast proxy 102 may also include a wired interface 142 in communication with a router 144, and a wireless interface 146 in communication with the WLAN 108. The router 144 communicates with a media server 150 over a wide-area network (WAN) 132, such as the Internet. The wired interface 142 includes a wired input module 154 and a wired output module 156. The wired interface 142 may be implemented as an Ethernet port. The wireless interface 146 includes a wireless input module 158 and a wireless output module 160. The wireless interface 146 may be compliant with all or part of IEEE standard 802.11, including draft and approved amendments 802.11a, 802.11b, 802.11e, 802.11g, 802.11i, 802.11k, 802.11n, 802.11v, and 802.11w.

Referring now to FIGS. 2A-2D, the media server 150 transmits a packet 300 to the wireless access point 104. As in FIG. 2A, the packet 300 may be formatted according to IEEE 802.3 and may therefore include a destination address (DA), a source address (SA), a type of the packet, and payload data. The source address may be the MAC address of the media server 150, and the destination address may be a multicast address. In one embodiment, the control module 126 may analyze the packet 300 and determine whether the destination address for the packet 300 is a unicast address or a multicast address. When the packet 300 includes a unicast destination address, the wireless multicast proxy 102 may transmit the packet without packet conversion.

Otherwise, the control module 126 determines unicast addresses that correspond to each multicast address using, for example, the multicast table 138. In one embodiment, only one packet 300 is received and processed by the wireless multicast proxy 102. In another embodiment, as in FIG. 2B, the packet aggregation module 139 may concatenate multiple packets (including the packet 300) that have a multicast address in common into an aggregated payload 301.

The aggregated payload 301 may have a format based on a communication standard. For example, IEEE 802.11n includes a protocol that allows concatenation of multiple Media Access Control (MAC) Service Data Unit (MSDU) subframes 302 into a single aggregate-MSDU (AMSDU) frame. In one embodiment, AMSDU frames are used only when the wireless client 106 supports AMSDU exchanges. A subframe 302 is shown by way of example in FIG. 2C. The AMSDU subframe 302 may include various fields, such as DA, SA, length, MSDU and padding. The length may correspond to the number of bytes in the MSDU field. The padding field may be included so that the length of the subframe 302 may be a multiple of four bytes or other similar multiples of bytes. The fields of the subframe 302 may be arranged in the same order as in another standard, such as IEEE 802.3.

The packet aggregation module 139 may therefore recognize the packet 300 as having the form of an AMSDU subframe and may concatenate the packet 300 with other packets from the media server 150. The packets from the media server 150 may be concatenated to form a payload 301 that resembles an AMSDU based frame. The payload 301 may include packets (including the packet 300) treated as AMSDU subframes 1-N, where the packets are positioned end-to-end.

Figure 2A:
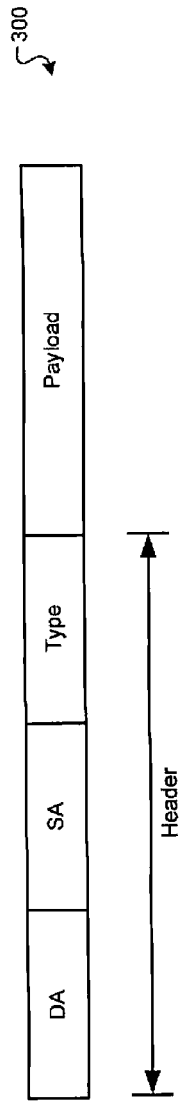
FIG. 2A illustrates a packet, according to an embodiment of the present disclosure.
Figure 2B:
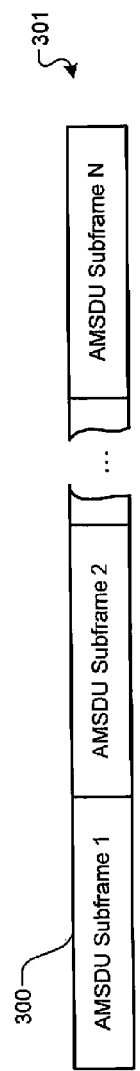
FIG. 2B illustrates a concatenation of packets into a frame, according to an embodiment of the present disclosure.
Figure 2C:
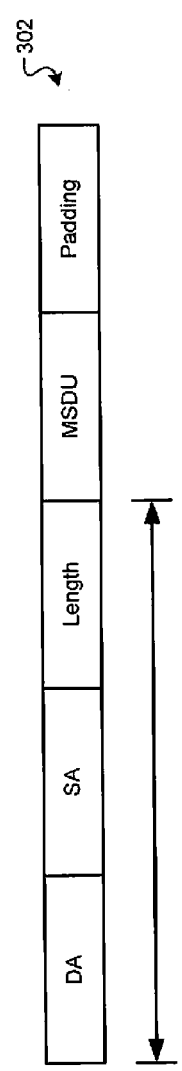
FIG. 2C illustrates an example of a subframe, according to an embodiment of the present disclosure.
Figure 2D:
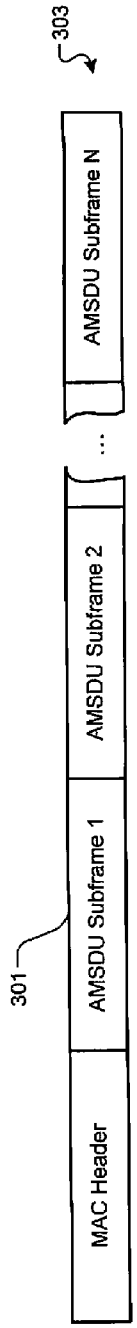
FIG. 2D illustrates a unicast packet, according to an embodiment of the present disclosure.

In FIG. 2D, the packet format module 140 may add a header, such as a MAC header, to the payload 301 to form an outgoing packet 303. For example, the MAC header may correspond to an IEEE 802.11 MAC header that includes a DA and a SA. The DA may correspond to the MAC address of one of the wireless clients 106. The payload 301 of the packet 303 may correspond to the AMSDU based frame. The wireless interface 146 then transmits the packet 303 to the destination address of the newly added MAC header.

Figure 3:
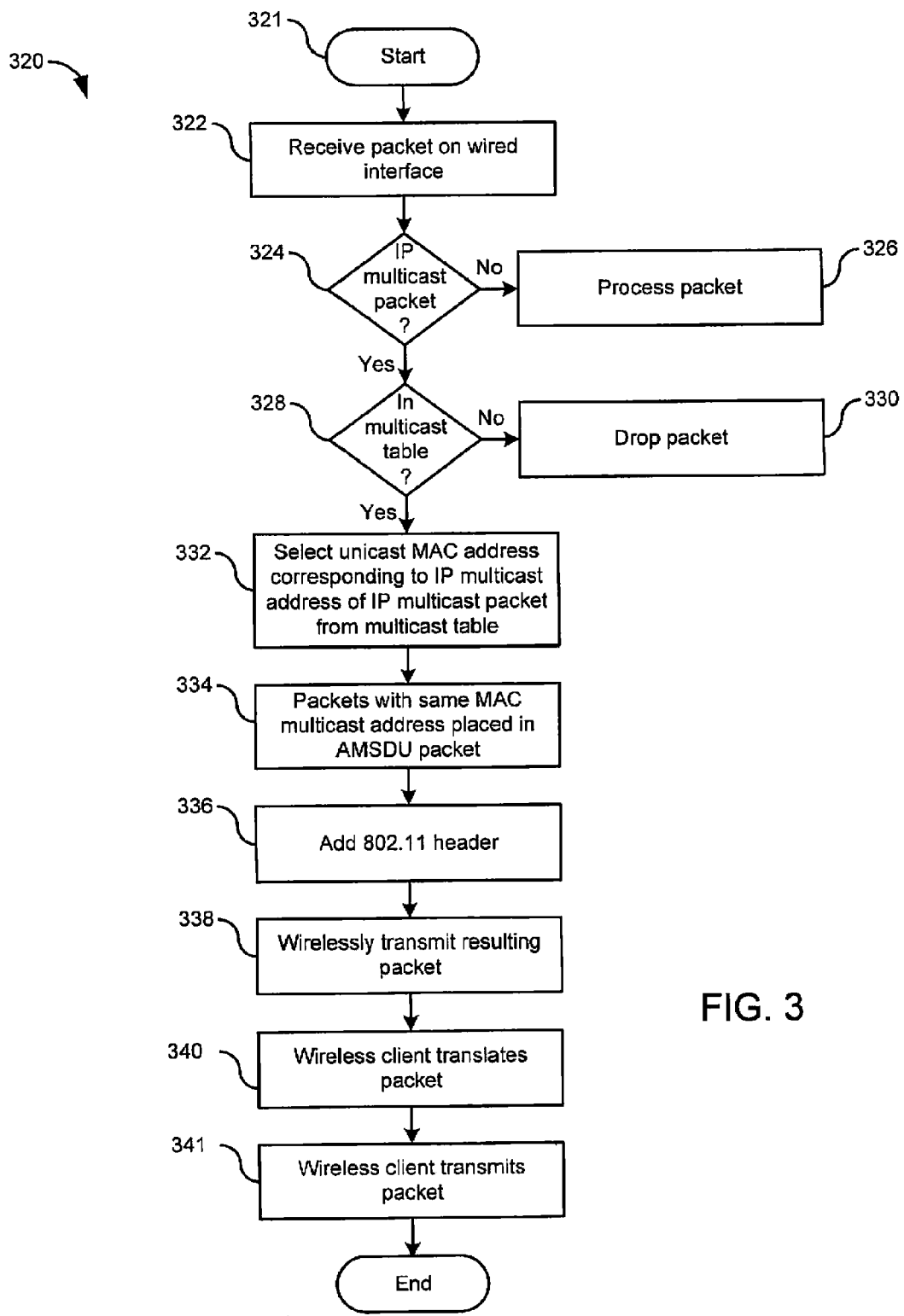
FIG. 3 illustrates a method for operating a communication system, according to an embodiment of the present disclosure.

Referring now to FIG. 3, a method 320 for communicating is illustrated according to an embodiment of the present disclosure. The method starts in step 321. In step 322, the wireless multicast proxy 102 receives a packet on the wired interface 142. In particular, the wired input module 154 of wired interface 142 receives the packet from the WAN 132 that is compliant with IEEE 802.3. In step 324, the control module 126 determines whether the packet is an IP multicast packet based on whether the packet has an IP multicast destination address.

In step 326, if the packet is not an IP multicast packet, the wireless multicast proxy 102 processes the packet according to a protocol, such as 802.11. For example, the packet is formatted according to the 802.11 standard and is then sent by wireless interface 146 to the destination wireless client 106. The access point 104 may therefore receive a unicast packet including a DA, a SA, a packet type and a payload and reformat the packet to include a DA, a receiver address (RA) of the access point 104, a type of the packet and a payload.

In step 328, if the packet is an IP multicast packet, the control module 126 determines whether the IP multicast address of the IP multicast packet is listed in the multicast table 138. Table 1 is an example of the multicast table 138.

TABLE 1

| Multicast IP Address | Unicast MAC Address | AMSDU Support |
|---|---|---|
| Multicast IP Address 1 | Count 1 <number of MAC addresses> | |
| | Unicast MAC Address 1 | Yes |
| | Unicast MAC Address 2 | Yes |
| | Unicast MAC Address 3 | No |
| Multicast IP Address 2 | Count 2 <number of MAC addresses> | |
| | Unicast MAC Address 4 | Yes |
| | Unicast MAC Address 5 | No |

For each multicast group, Table 1 lists a corresponding IP multicast address, the number of unicast MAC addresses in the multicast group, and the unicast MAC addresses. The multicast table 138 may have arrangements other than those shown in Table 1. In some embodiments, the multicast table 138 is populated by snooping traffic and the AMSDU support capability of the wireless client 106.

In step 330, if the IP multicast destination address of the IP multicast packet is not listed in the multicast table 138, the control module 126 may drop the IP multicast packet. In other embodiments, the control module 126 may take other actions instead. For example, the control module 126 may forward the IP multicast packet to the WLAN 108.

Otherwise, if the IP multicast destination address of the IP multicast packet is listed in multicast table 138, the control module 126 identifies one or more wireless clients 106 based on the IP multicast packet. In step 332, the control module 126 selects a unicast MAC address from the multicast table 138 corresponding to the IP multicast address of the IP multicast packet. In step 334, the packet aggregation module 139 concatenates packets that have the same multicast address based on, for example, AMSDU aggregation according to the IEEE 802.11n standard, as discussed above.

In step 336, the packet format module 140 adds a packet header, such as an 802.11 compliant header, to the aggregated packets. For example, referring to Table 1, if the IP multicast address is Multicast IP Address 1, the control module 126 selects Unicast MAC Address 1 as the MAC destination address for the header of the aggregated packet. In step 338, the wireless output module 160 wirelessly transmits the resulting packet.

In step 340, the wireless client 106 receives the aggregated packet. The wireless client 106 may translate the packet back to one or more packets that are compliant with the same standard (e.g. IEEE 802.3) as the media server 150. In step 341, the wireless client 106 may transmit the packets to one or more client devices 110. In one embodiment, the wireless client 106 may be compliant with the wireless access point standard (e.g. IEEE 802.11n) and therefore may be able to recognize the aggregated packet based on the header added to the aggregated packet by the packet format module 140. The wireless client 106 may strip off the added header and transmit the subframes to one or more client devices 110 as IEEE 802.3 packets. The original packets from the media server 150 may therefore be transmitted through the system 100 without modification.

In operation, the present disclosure may include converting a multicast packet to a unicast packet without modifying the data within the multicast packet. The present disclosure may also include ultimately transmitting the multicast packet to a final destination (e.g. a client device 110) as the unicast packet. In one embodiment, the control module 126 determines a unicast address that corresponds to the multicast address of the multicast packet. The packet aggregation module 139 and the packet format module 140 then encapsulate all packets having the same multicast address with a new MAC header having a unicast address. The MAC header may be generated as defined in the 802.11n standard. The wireless client 106 processes the packet as defined in the IEEE 802.11n standard and may strip away the MAC header. The wireless client 106 may then transmit the original multicast packets. The present disclosure therefore includes a non-proprietary mechanism for wireless clients 106 and may use the standard three address frame structure defined in the IEEE 802.11n standard for packet exchanges.

Figure 4:
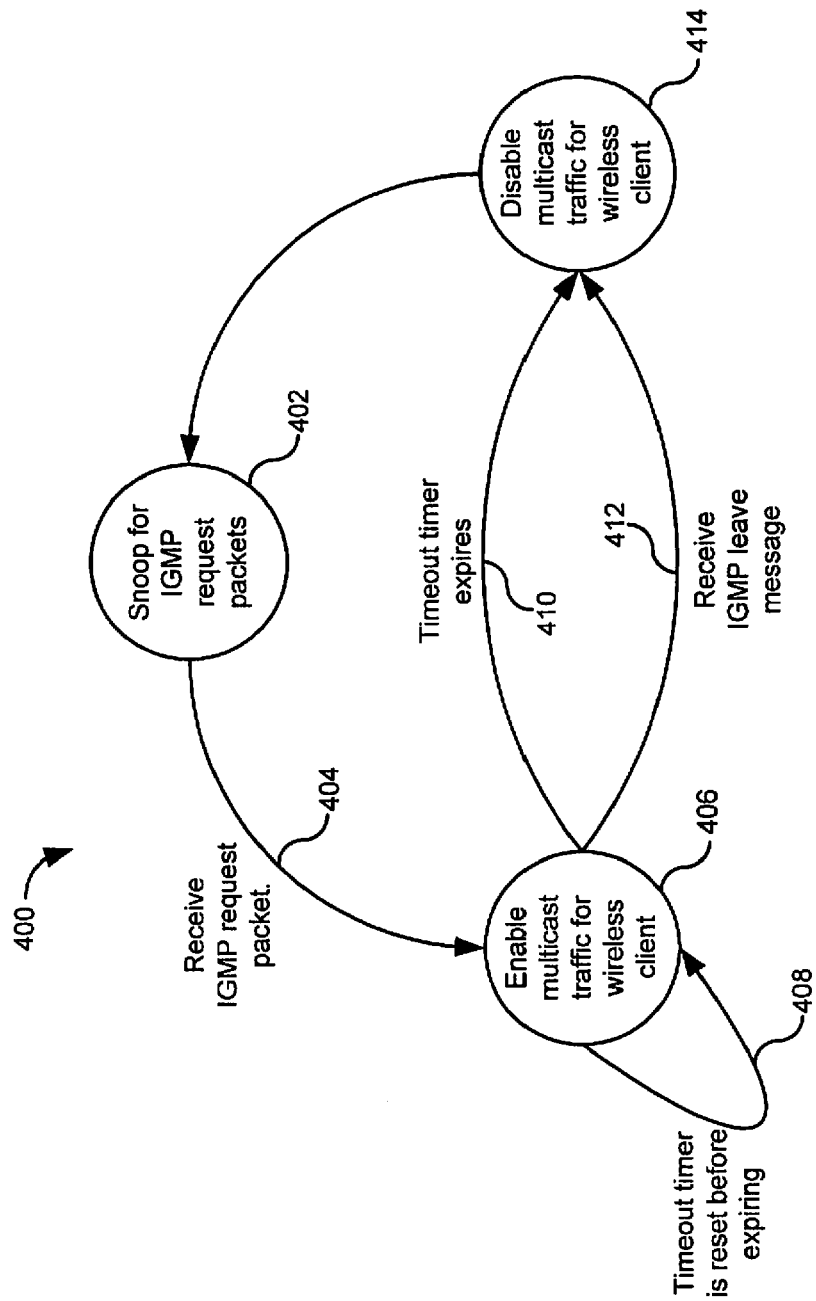
FIG. 4 illustrates a state machine for a multicast snoop module, according to an embodiment of the present disclosure.

Referring now to FIG. 4, the multicast snoop module 128 may populate and maintain the multicast table 138 by snooping traffic on the WLAN 108. A state machine 400 is illustrated for a multicast snoop module 128, according to an embodiment of the present disclosure. In step 402, the multicast snoop module 128 snoops for IGMP request packets. The wireless clients 106 transmit IGMP request packets in order to join multicast groups. Further, the multicast table 138 may also be populated with the AMSDU support capability of the wireless client 106.

In step 404, when an IGMP request packet is received from a wireless client 106, the multicast snoop module 128 enables multicast traffic for that wireless client 106 in step 406. For example, if multicast table 138 does not contain an entry for the wireless client 106 in the multicast group, multicast snoop module 128 adds an entry to multicast table 138 and starts a timeout timer for the wireless client 106. However, if multicast table 138 already contains an entry for the wireless client 106 in the multicast group, the multicast snoop module 128 may simply re-start the timeout timer for the wireless client 106.

In step 408, as long as the timeout timer is reset before expiring, the multicast snoop module 128 keeps multicast traffic enabled for the wireless client 106 in step 406. If the timeout timer for the wireless client 106 in the multicast group expires in step 410, or if an IGMP leave message is received from the wireless client 106 for the multicast group in step 412, the multicast snoop module 128 disables the wireless client 106 in the multicast group in step 414. For example, the multicast snoop module 128 may remove the entry for the wireless client 106 in the multicast group from the multicast table 138. The multicast snoop module 128 continues to snoop for IGMP request packets in step 402.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first network device comprising:
a first module configured to relate a plurality of addresses of a group of network devices to a first address, wherein the plurality of addresses are respective addresses of the network devices in the group of network devices;
a control module configured to determine whether both a first packet and a second packet have the first address;
an aggregation module configured to, in response to the control module determining that both the first packet and the second packet have the first address, concatenate the first packet and the second packet to provide aggregated data;
a format module configured to add a header to the aggregated data to generate a third packet for a second network device; and
a first interface configured to, based on whether transmission to the second network device is enabled for the third packet, transmit the third packet to the second network device,
wherein the first module is configured to disable transmission of the third packet to the second network device if (i) a timer for the second network device expires, or (ii) a leave message is received from the second network device by the first network device, wherein the leave message indicates the second network device is leaving the group of network devices.

2. The first network device of claim 1, wherein the aggregation module is configured to, without removing data from the first packet and the second packet, concatenate the first packet and the second packet to provide the aggregated data.

3. The first network device of claim 1, wherein:
the aggregated data corresponds to an aggregate media access control service data unit frame;
the first packet corresponds to a first subframe of the aggregate media access control service data unit frame; and
the second packet corresponds to a second subframe of the aggregate media access control service data unit frame.

4. The first network device of claim 1, wherein:
the first network device and the second network device wirelessly communicate with each other in a wireless local area network; and
the first interface is configured to, based on the header, wirelessly transmit the third packet to the second network device in the wireless local area network.

5. The first network device of claim 1, wherein:
the first module is configured to generate a table, wherein entries in the table relate the plurality of addresses of the group of network devices to the first address; and
while disabling transmission of the third packet to the second network device, remove an entry for the second network device from the table.

6. The first network device of claim 5, wherein:
the control module is configured to identify the network devices in the group of network devices based on (i) the table, and (ii) the first address;
the first module is configured to generate the table based on request messages received from the network devices in the group of network devices; and
the request messages request joining the group of network devices.

7. The first network device of claim 1, wherein:
the first module is configured to generate a table, wherein entries in the table relate the plurality of addresses of the group of network devices to the first address;
the control module is configured to receive a fourth packet, determine whether an address of the fourth packet corresponds to two or more of the network devices in the group of network devices;
the first interface is configured to, if the address of the fourth packet does not correspond to two or more of the network devices in the group of network devices, transmit the fourth packet to one of the network devices in the group of network devices corresponding to the address of the fourth packet; and
the control module is configured to, (i) if the address of the fourth packet corresponds to two or more of the network devices in the group of network devices, determine whether the address of the fourth packet is listed in the table, (ii) if the address of the fourth packet is not listed in the table, drop the fourth packet or forward the fourth packet to a wireless local area network, and (iii) if the address of the fourth packet is listed in the table, select an address for one of the network devices in the group of network devices for the fourth packet.

8. The first network device of claim 1, wherein:
the first network device comprises a second interface; and
the second interface is configured to receive the first packet and the second packet from a router.

9. A network system comprising:
the first network device of claim 1, wherein the first network device comprises a second interface, and wherein the second interface is configured to receive the first packet and the second packet; and
a router configured to (i) receive the first packet and the second packet from a wireless local area network, and (ii) transmit the first packet and the second packet to the second interface.

10. A network system, comprising:
the first network device of claim 1;
the second network device; and
a plurality of client devices,
wherein the second network device removes the header from the third packet and transmits frames of the third packet respectively to the plurality of client devices.

11. A method of operating a first network device, the method comprising:
relating a plurality of addresses of a group of network devices to a first address, wherein the plurality of addresses are respective addresses of the network devices in the group of network devices;
determining whether both a first packet and a second packet have the first address;
in response to determining that both the first packet and the second packet have the first address, concatenating the first packet and the second packet to provide aggregated data;
adding a header to the aggregated data to generate a third packet for a second network device;
based on whether transmission to the second network device is enabled for the third packet, transmitting the third packet to the second network device; and
disabling transmission of the third packet to the second network device if (i) a timer for the second network device expires, or (ii) a leave message is received from the second network device by the first network device, wherein the leave message indicates the second network device is leaving the group of network devices.

12. The method of claim 11, wherein, without removing data from the first packet and the second packet, the first packet and the second packet are concatenated to provide the aggregated data.

13. The method of claim 11, wherein:
the aggregated data corresponds to an aggregate media access control service data unit frame;
the first packet corresponds to a first subframe of the aggregate media access control service data unit frame; and
the second packet corresponds to a second subframe of the aggregate media access control service data unit frame.

14. The method of claim 11, wherein, based on the header, the third packet is wirelessly transmitted to the second network device in a wireless local area network.

15. The method of claim 11, further comprising:
generating a table, wherein entries in the table relate the plurality of addresses of the group of network devices to the first address; and
while disabling transmission of the third packet to the second network device, removing an entry for the second network device from the table.

16. The method of claim 15, further comprising identifying the network devices in the group of network devices based on (i) the table, and (ii) the first address, wherein:
the table is generated based on request messages received from the network devices in the group of network devices; and
the request messages request joining the group of network devices.

17. The method of claim 11, further comprising:
generating a table, wherein entries in the table relate the plurality of addresses respectively of the group of network devices to the first address;
receiving a fourth packet at the first network device, determining whether an address of the fourth packet corresponds to two or more of the network devices in the group of network devices;
if the address of the fourth packet does not correspond to two or more of the network devise in the group of network devices, transmitting the fourth packet to one of the network devices in the group of network devices corresponding to the address of the fourth packet;
if the address of the fourth packet corresponds to two or more of the network devices in the group of network devices, determining whether the address of the fourth packet is listed in the table;
if the address of the fourth packet is not listed in the table, dropping the fourth packet or forward the fourth packet to a wireless local area network; and
if the address of the fourth packet is listed in the table, selecting an address for one of the network devices in the group of network devices for the fourth packet.

18. The method of claim 11, further comprising receiving the first packet and the second packet at the first network device from a router.

19. The method of claim 11, further comprising:
receiving the first packet and the second packet from a wireless local area network at a router;
transmitting the first packet and the second packet to the first network device; and
receiving the first packet and the second packet at the first network device.

20. The method of claim 11, comprising:
removing the header from the third packet at the second network device; and transmitting frames of the third packet from the second network device to respectively a plurality of client devices.

* * * * *